Figure 1:
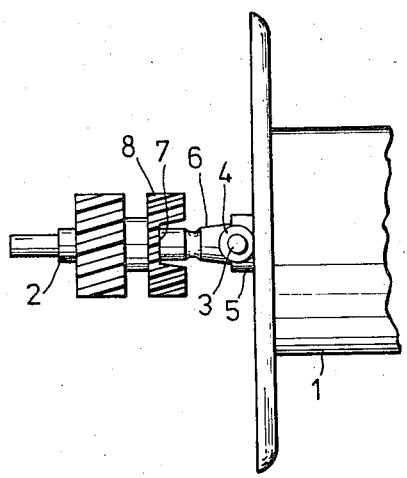

United States Patent

Svensson

[11] 3,812,940
[45] May 28, 1974

[54] COUPLING DEVICE FOR FISHING REELS

[75] Inventor: Hugo Ragnvald Svensson, Svangsta, Sweden

[73] Assignee: ABU Aktiebolag, Svangsta, Sweden

[22] Filed: Nov. 2, 1972

[21] Appl. No.: 303,218

[30] Foreign Application Priority Data
Nov. 2, 1971  Sweden............................ 13973/71

[52] U.S. Cl.............. 192/17, 192/14, 242/84.52 C, 242/212
[51] Int. Cl....................... F16d 13/76, A01k 89/02
[58] Field of Search............192/17 R, 18 R, 14, 67; 242/84.52 C, 212

[56] References Cited
UNITED STATES PATENTS

| 2,446,354 | 8/1948 | Wolfe ........................... 242/212 X |
| 2,489,447 | 11/1949 | Borgström................... 242/84.52 C |
| 2,553,200 | 5/1951 | Mandolf et al. ................ 242/212 X |
| 2,573,240 | 10/1951 | Berlinger ....................... 242/212 X |

Primary Examiner—Samuel Scott
Assistant Examiner—Lance W. Chandler

[57] ABSTRACT

This invention relates to a coupling device for fishing reels in which a gear pinion forming a part of the drive mechanism for the spool is displaceable axially on the spool shaft for coupling and disengaging the drive mechanism and the spool. In such devices it is known to provide centrifugal brake blocks slidably mounted on a diametral pin fixed onto the spool shaft and displaceable under centrifugal action against a circular braking drum, the one end of the pinion being formed into one part of a claw coupling engageable by a diametral coupling member formed by opposed flattened portions on the shaft. According to the invention the end of the pinion turned towards the spool has an inner bore capable of sliding over the portion of the shaft supporting the guide pin for the brake blocks and a transverse diametral slot for direct engagement with the guide pin.

2 Claims, 2 Drawing Figures

PATENTED MAY 28 1974　　　　　　　　　　　　3,812,940

COUPLING DEVICE FOR FISHING REELS

This invention concerns a coupling device for fishing reels of the type in which the spool shaft has a gear pinion operable by a driving mechanism and axially displaceable on said shaft, as shown in the patent to Berlinger U.S. Pat. No. 2,573,240 whose pinion 134 is described starting in column 3, line 70, said pinion being provided with a diametral slot which by axial displacement of the pinion is engageable with a diametral coupling member fixedly mounted on the shaft which further has a diametral guiding pin for centrifugal brake blocks slidable on said pin.

In known fishing reels of this kind the diametral coupling member consists of two opposed flattened portions on a thickened portion of the reel shaft. In fishing reels of this kind having a centrifugal brake consisting of brake blocks slidable on a diametral guiding pin which brake blocks upon rotation of the reel are displaced outwards by the centrifugal force against a fixed annular brake surface, the guiding pin is fixedly inserted into a diametral bore in the thickened portion of the shaft. Such a structure is shown in the patent to Borgstrom U.S. Pat. No. 2,489,447.

This invention concerns an improvement and a simplification of the coupling between the gear pinion and the shaft, and consists in that the pinion on its end facing the guide pin and provided with the diametral slot has its axial bore widened to a diameter capable of surrounding the thickened shaft portion supporting the guide pin with some play and is displaceable over said thickened portion for direct engagement of the diametral slot with the guiding pin.

Thereby the invention presents the advantage of avoiding the forming of the flattened portions on the thicker portion of the shaft which always forms a delicate operation. Another advantage of the invention is that a sure engagement between the guide pin and the slot can be attained by a lesser axial displacement of the pinion and by a lesser necessary axial length of the coupling members mounted onto the shaft since the axial space necessary for the means mounted in axial succession along the shaft is reduced to that necessary to mount the transverse guiding pin there being no thickened portion to be provided with opposed flattened sides.

A very important further advantage of the invention is that, since the axial length occupied by the parts formed onto the shaft and the axial stroke of the slidable pinion are reduced, the cogs of the pinion can be made shorter than hitherto and can be concentrated on the part of the pinion remaining outside the outer end of the thickened portion of the shaft which in its turn makes it possible to give the active part of the pinion a lesser diameter, thereby increasing the range of possible gear ratios between the pinion and the cooperating gear of the drive mechanism.

With regard to the high precision necessary in the working of the very small parts in question, the avoiding of the flattened portions on the shaft implies an important reduction of the manufacturing costs and with regard to the always actual necessity of having a construction requiring as reduced space as possible, the reduction of the space requirements, besides widening the possible range of transmission ratios, implies an important technical progress.

If considered necessary, the portion of the guiding pin inserted into the thickened portion of the reel shaft and cooperating with the slot in the pinion can be made somewhat thicker than the portion supporting the brake blocks, thereby providing a surer coupling engagement and above all, a lesser wear of the slot in the pinion.

An embodiment of the invention is described in the following description with reference to the accompanying drawing, in which FIG. 1 shows for comparison the conventional construction and FIG. 2 a coupling device according to the invention.

In both Figures the spool 1 is fixedly mounted on a shaft 2, the number 3 indicating a diametral guiding pin for brake blocks 4 slidably mounted thereon. In conventional constructions of the type shown in FIG. 1 the shaft 2 near the spool 1 supports a guiding pin 3 and outwards thereof two opposed flattened portions 6 forming one of the coupling halves, the other coupling half being formed by a diametral slot 7 in the pinion 8 which is axially slidable on the shaft.

Figure 2:
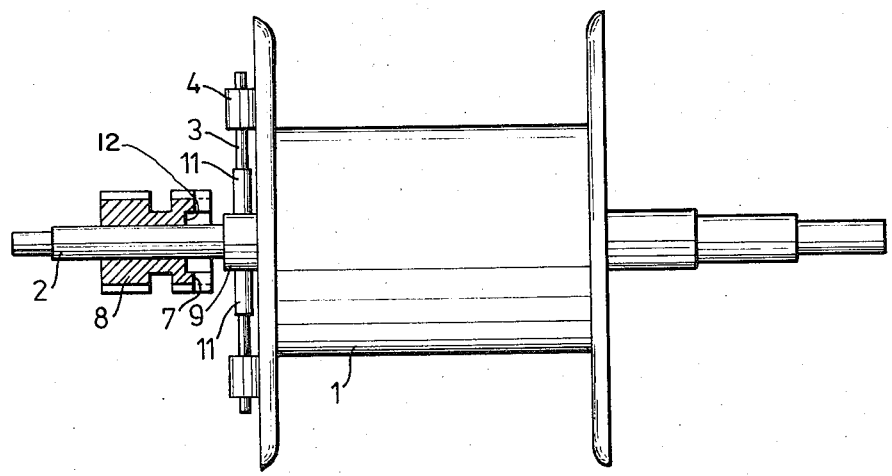

According to the invention, an embodiment of which is shown in FIG. 2, the shaft 2 immediately adjacent to the spool has a portion of larger diameter 9, the length of said portion being reduced to what is strictly necessary to support the guiding pin 3. The pinion 8 on its end facing the spool has an enlarged inner bore 12 of mainly the same or slightly larger diameter than the thicker portion 9 of the shaft so that, upon axial displacement of the pinion towards the spool 1, this portion slides over the thicker shaft portion 9 and with its diametral slot 10 directly engages the portions 11 of the guiding pin 3 immediately adjacent to the shaft, said portion 11 being slightly thicker than the outer portions, thereby providing a surer coupling engagement and a lesser wear of the pinion.

A comparison between FIGS. 1 and 2 shows that a considerable reduction of space in the axial direction is obtained by the device according to the invention. This reduction of axial space is even greater than what appears on the drawing, the shaft end projecting outside the pinion in its disengaged position being larger in FIG. 2 than in FIG. 1. Further, in FIG. 2 the pinion, in its disengaged position, might be placed much nearer the spool since the axial displacement for coupling need not be larger than the diameter of the portions 11 of the guiding pin 3.

What is claimed is:

1. For use in a fishing reel, a shaft, a spool nonrotatably secured on said shaft, said shaft having an enlarged portion adjacent an end of said spool, a diametral pin secured to said enlarged portion, a brake block slidably mounted on said pin, a drivable pinion axially slidable on said shaft adjacent said enlarged portion thereof, a diametral slot formed in the face of said pinion adjacent said spool and having a width sufficient to receive said diametral pin and a bore of enlarged diameter formed partially through said pinion and intersecting said slot, said bore being of sufficient diameter to receive said enlarged portion of said shaft whereby said pinion may be moved axially over said enlarged portion and said slot engage said pin to provide driving engagement with said shaft.

2. For use in a fishing reel, a shaft, a spool nonrotatably secured on said shaft, said shaft having an enlarged portion adjacent an end of said spool, a diametral pin secured to said enlarged portion, said diametral pin having an enlarged diameter adjacent to said enlarged portion of said shaft and a reduced diameter radially distant from said enlarged portion to receive a brake block, a brake block slidably mounted on said reduced portion, a drivable pinion axially slidable on said shaft adjacent said enlarged portion thereof, a diametral slot formed in the face of said pinion adjacent said spool and having a width sufficient to receive said diametral pin and a bore of enlarged diameter formed partially through said pinion and intersecting said slot, said bore being of sufficient diameter to receive said enlarged portion of said shaft whereby said pinion may be moved axially over said enlarged portion and said slot engage said pin to provide driving engagement with said shaft.

* * * * *